United States Patent
McLaughlin et al.

(10) Patent No.: US 7,055,546 B2
(45) Date of Patent: Jun. 6, 2006

(54) FLUID INTAKE PRESSURE REGULATING SYSTEM

(76) Inventors: John E. McLaughlin, 3 Country La., Lake Grove, NY (US) 11755; Neocles G. Athanasiades, 6 Mayeeck Dr., Setauket, NY (US) 11723; Toh M. Meng, 15 Sunflower Dr., Hauppauge, NY (US) 11788

( * ) Notice: Subject to any disclaimer, the term of this patent is extended or adjusted under 35 U.S.C. 154(b) by 419 days.

(21) Appl. No.: 10/668,128

(22) Filed: Sep. 24, 2003

(65) Prior Publication Data

US 2005/0061373 A1  Mar. 24, 2005

(51) Int. Cl.
*F16K 31/12* (2006.01)
*G05D 11/00* (2006.01)

(52) U.S. Cl. .................. 137/487.5; 137/109; 137/389; 137/393; 137/565.01; 137/565.37; 137/557

(58) Field of Classification Search ........... 137/565.01, 137/487.5, 389, 393, 557, 565.34, 565.37, 137/109
See application file for complete search history.

(56) References Cited

U.S. PATENT DOCUMENTS

| 3,511,579 | A | * | 5/1970 | Gray et al. | 417/6 |
| 3,744,932 | A | * | 7/1973 | Prevett | 417/8 |
| 4,502,842 | A | * | 3/1985 | Currier et al. | 417/8 |
| 4,718,443 | A | * | 1/1988 | Adney et al. | 137/8 |
| 5,713,724 | A | * | 2/1998 | Centers et al. | 417/53 |

* cited by examiner

*Primary Examiner*—A. Michael Chambers
(74) *Attorney, Agent, or Firm*—Frank L. Hart

(57) ABSTRACT

A fluid intake pressure regulating system of this invention maintains the pressure of fluid entering a pump below a preselected level for avoiding undesirably high fluid discharge pressure exiting the pump.

6 Claims, 1 Drawing Sheet

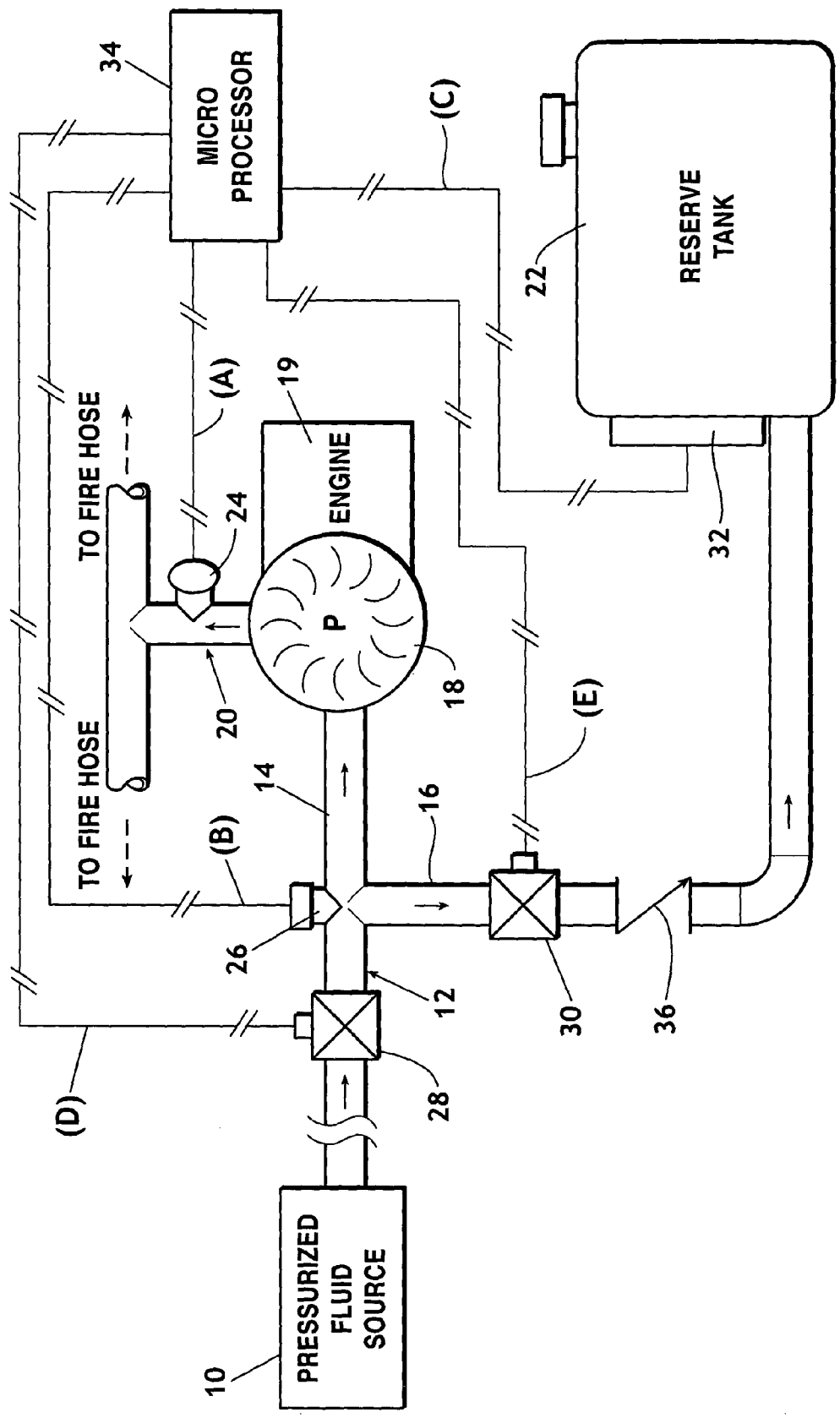

FLUID INTAKE PRESSURE REGULATING SYSTEM

BACKGROUND OF THE INVENTION

1. Field of the Invention

The subject invention relates to a fluid intake pressure regulating system. More particularly, the subject invention relates to a fluid pumping system wherein the fluid pressure entering the pump is maintained below a preselected magnitude.

2. Description of Related Art Including Information Disclosed Under 37 CFR 1.97 and 1.98

In the art of pumping fluid, more particularly water, there often is a problem of regulating the fluid pressure entering the pump and thereby provide a desirable fluid pressure exiting the pump. This is particularly true where the pumping system is a pumper truck of a fire department. In such example use, the pressure entering the pump can be in excess of the pressure desired at the hose outlet resulting in the pump further increasing the pressure and causing the hose discharge pressure to be dangerously high and difficult to control by the individual firemen.

To be more specific, the fluid pressure from a fire hydrant can be in the range of about zero to about 300 psi. The magnitude of pressure can also change during the pumping operations. The desired discharge pressure of a fire hose is in the range of 100 to 150 psi. The pump of a pumper truck will generally boost the incoming fluid pressure another 40 to 100 psi. Thus there is a continuous danger to the firemen of pressure surges causing the fire hose to become uncontrollable.

The present invention is directed to overcome one or more of the problems as set forth above.

BRIEF SUMMARY OF THE INVENTION

In one aspect of the invention, a fluid intake pressure regulating system has a master header connected to first and second fluid discharge lines and is connectable to a pressurized fluid source. The first fluid discharge line is connected to a pump for delivering fluid from the pressurized fluid source, through the pump and to a secondary header and then to fire hoses for example. The second fluid discharge line is connected to a reserve tank. A flow meter is connected to the secondary discharge header and is adapted to deliver a signal (A) in response to fluid flow through the header. A pressure transducer is connected to the master header and is adapted to measure the fluid pressure within the master header and deliver a signal (B) response to said measured pressure.

A master control valve is connectable to the pressurized fluid source and connected to the master header. The master control valve is adapted for controlling the fluid passing into the master header. A secondary control valve is positioned in the second fluid discharge line between the master header and the reserve tank. The secondary control valve is adapted for controlling fluid passing from the master header and into the reserve tank. Means is associated with the reserve tank for measuring the fluid level within the tank and delivering a signal (C) in response to said measurement.

A micro processor is provided which has a manual set point. The micro processor is electronically connected to the flow meter, the pressure transducer, the measuring means, the master control valve and the secondary control valve. The micro processor is adapted to receive signals (A–C) and deliver controlling signals (D) and (E) to the master control valve and secondary control valve respectfully and responsively control the fluid pressure entering the pump, maintain the reserve tank in a full condition, and prevent fluid having undesirably high fluid pressure from discharging from the secondary header.

BRIEF DESCRIPTION OF THE SEVERAL VIEWS OF THE DRAWING(S)

FIG. 1, the single view of the drawings, is a schematic view of the subject invention.

DETAILED DESCRIPTION OF THE INVENTION

Referring to the drawing, the subject invention is connectable to a pressurized fluid source 10, such as a fire hydrant, for example. The fluid intake pressure regulating system of this invention has a master header 12 connected to first and second fluid discharge lines 14,16 and is connectable to the pressurized fluid source 10.

The first fluid discharge line 14 is connected to a pump 18 driven by engine 19 for delivering fluid from the pressurized fluid source 10, through the pump 18 and to a secondary header 20. The second fluid discharge line 16 is connected to a reserve tank 22.

A flow meter 24 is associated with the secondary header 20 and is adapted to deliver a signal "A" in response to fluid flow through the header 20. A pressure transducer 26 is associated with the master header 12 and is adapted to measure the fluid pressure within the master header 12 and deliver a signal "B" responsive to said measured pressure.

A master control valve 28 is connectable to the pressurized fluid source 10 and is connected to the master header 12. The master control valve 28 is adapted for controlling the fluid passing into the master header 12. A secondary control valve 30 is positioned in the second fluid discharge line 16 between the master header 12 and the reserve tank 22. The secondary control valve 30 is adapted for controlling fluid passing from the master header 12 and into the reserve tank 22. Means 32 is associated with the reserve tank 22 for measuring the fluid level within the reserve tank 22 and delivering a signal "C" in response to said measurement.

A micro processor 34 having a manual set point is electronically connected to the flow meter 24, the pressure transducer 26, the measuring means 32, the master control valve 28 and the secondary control valve 30. The micro processor is adapted to receive signals (A–C) and deliver controlling signals "D" and "E" to master control valve 28 and secondary control valve 30 respectfully and responsively control the fluid pressure entering the pump 18, maintain the reserve tank 22 in a full condition, and prevent fluid having undesirably high fluid pressure from discharging from the secondary header 20.

During operation of the apparatus of this invention, the microprocessor 34 will deliver a signal "D" to the master control valve 28 and responsively close the master control valve 28 in response to receiving a signal "A" from the flow meter indicating the absence of fluid flow into the secondary header 20.

When signal "A" from the flow meter 24 indicated fluid flow through the secondary header 20, the micro processor 34 will compare the pressure signal "B" from the pressure transducer to the manual set point, responsively move the master control valve 28, and maintain the pressure within the master header 12 at or below the preselected pressure level of the set point.

When signal "C" from the fluid level means 32 indicates a less than full reserve tank 22, and a signal "B" indicates pressure within the master header 12, the micro processor 34 will respectfully deliver a signal "E" to open the secondary control valve 30 and deliver fluid from the master header 12 into the reserve tank 22. Responsive to receiving a signal "C" indicating a full reserve tank 22, the micro processor will deliver a signal "E" to close the secondary control valve 30.

Responsive to a signal "B" indicating the absence of fluid flow through the master header 12, the master control valve 28 will be caused to move, and the second control valve 30 will be opened in response to the subsequent absence of pressure change within the master header 12.

A check valve 36 is positioned in the second fluid discharge line 16 between the secondary control valve 30 and the reserve tank 22 and maintains fluid flow only in a direction from the secondary control valve 30 toward the reserve tank 22.

Other aspects, objects and advantages of this invention can be obtained from a study of the drawing, the disclosure and the append claims.

What is claimed is:

1. A fluid intake pressure regulating system having a master header connected to first and second fluid discharge lines and being connectable to a pressurized fluid source, said first fluid discharge line being connected to a pump for delivering fluid from the pressurized fluid source, through the pump, and to a secondary header, and said second fluid discharge line being connected to a reserve tank, comprising:

a flow meter connected to the secondary header and being adapted to deliver a signal (A) in response to fluid flow through the header;

a pressure transducer connected to the master header and being adapted to measure the fluid pressure within the master header and deliver a signal (B) responsive to said measured pressure;

a master control valve connectable to the pressurized fluid source and to the master header and being adapted for controlling the fluid passing into the master header;

a secondary control valve positioned in the second fluid discharge line between the master header and the reserve tank and being adapted for controlling fluid passing from the master header and into the reserve tank;

means associated with the reserve tank for measuring the fluid level within the reserve tank and delivering a signal (C) in response to said measurement;

a micro processor having a manual set point and being electronically connected to the flow meter, the pressure transducer, the measuring means, the master control valve and the secondary control valve and being adapted to receive signals (A–C) and deliver controlling signals (D and E) to the master control valve and secondary control valve respectfully and responsively control the fluid pressure entering the pump, maintain the reserve tank in a full condition, and prevent fluid having undesirably high fluid pressure from discharging from the secondary header.

2. A pressure regulating system, as set forth in claim 1, wherein, responsive to receiving a signal (A) from the flow meter indicating fluid flow through the secondary header, the micro processor will compare the pressure signal (B) from the pressure transducer 26 to the manual set point, responsively move the master control valve, and maintain the pressure within the master header below the preselected pressure level of the set point.

3. A pressure regulating system, as set forth in claim 1, wherein, responsive to receiving a signal (C) from the fluid level means indicating a less than full reserve tank and a signal (A) indicating desirable pressure in the first fluid discharge line, the micro processor will deliver a signal (E) to open the secondary control valve and deliver fluid from the master header into the reserve tank.

4. A pressure regulating system, as set forth in claim 1, wherein, responsive to receiving a signal (C) indicating a full reserve tank, the micro processor will deliver a signal (E) to close the secondary control valve.

5. A pressure regulating system, as set forth in claim 4, wherein responsive to a signal (B) indicating the absence of fluid flow through the master header during movement of the master control valve, the secondary control valve will be opened.

6. A pressure regulating system, as set forth in claim 1, including a check valve positioned in the second fluid discharge line between the secondary control valve and the reserve tank and maintaining fluid flow only in a direction from the secondary control valve toward the reserve tank.

\* \* \* \* \*